Patented Dec. 26, 1922.

1,440,011

UNITED STATES PATENT OFFICE.

DAVID F. HOSMAN, OF SCOTTSBLUFF, NEBRASKA.

ICE CREAM BASE AND PROCESS OF MAKING SAME.

No Drawing.     Application filed November 22, 1922. Serial No. 602,604.

*To all whom it may concern:*

Be it known that I, DAVID FAY HOSMAN, a citizen of the United States, residing at Scottsbluff, in the county of Scotts Bluff and State of Nebraska, have invented new and useful Improvements in Ice-Cream Bases and Processes of Making Same, of which the following is a specification.

The present invention relates to the manufacture of ice cream and involves the production of an intermediate compound namely an ice cream base in a novel condition, in which it is stable, sterilized and preferably put up into sealed containers which can be sold and shipped to remote points.

In accordance with the present invention I first prepare the ice cream base, which is sterilized and preferably packaged, in which condition it will keep almost indefinitely. This base can then be shipped in the form of packages to any part of the country where it is to be used, after which it is diluted with milk or equivalent material, and is then ready for the freezing operation. A suitable flavoring material is of course to be added at the time of freezing, and any desired coloring material can also be added at the same time, or at any desired stage of the process.

The most important point of the present invention is the production of the ice cream base and this is preferably so prepared that it can subsequently be diluted with an equal volume of milk, just prior to freezing.

The preferred mode of producing the base is the mixing together of a material containing butter fat in a relatively concentrated state, a material containing non-fatty milk solids in a relatively concentrated state, sugar in a relatively concentrated state and a binder of a gelatinous to gummy nature. These ingredients are thoroughly mixed together in proportions as indicated below, and are then passed together through a homogenizer, whereby there is produced a mixture which will be found to be relatively stable and which is then sterilized by heating to somewhat above the boiling point of water.

This product preferably consists of (*a*) butter fat, (*b*) non-fatty milk solids, (*c*) sugar and (*d*) a binder. The term "butter fat" is intended to cover the fat content of normal milk. The term "non-fatty milk solids" is intended to cover all of the solid materials normally contained in milk, except the butter fat.

These components may be employed (i. e. added to the mixture, or used in making up the mixture constituting the base) each singly if desired, or some of the components used can be added (wholly or partly) as materials or manufactured products normally containing two or more of such components.

The butter fat content of the mixture is such that when diluted with an equal volume of milk, and the mixture flavored and frozen, the product will contain the desired quantity of butter fat, in order to conform to the desired specifications or in order to conform to the local laws or regulations as to fat content.

The butter fat may be and is ordinarily preferably used in the form of unsalted butter. Other forms of concentrated butter fat material can be employed for furnishing all or a part of the butter fat content of the finished base, examples of such material being concentrated cream or ordinary cream of any desired richness say from 25 per cent up to even 60 per cent or so of butter fat. Also if desired, some portion of the butter fat content of the base can be added in the form of concentrated whole milk, concentrated enriched milk, and for producing mixtures relatively low in fat a portion of the butter fat content of the base can be added in the form of ordinary milk. Where concentrated milk, concentrated cream and the like are referred to these may be liquid concentrates or dry products as desired, and they may contain sweetening or not as desired.

The milk solids other than fat, hereinafter referred to as non-fatty milk solids, can be added in various forms. Thus dry or concentrated whole milk or skimmed milk, or dry or concentrated enriched milk constitute suitable forms in which the non-fatty milk solids can be added. These products may be sweetened or not as desired. A particularly suitable form for the addition of the non-fatty milk solids is sweetened condensed skimmed milk, which may have been concentrated to any desired extent. A particularly suitable form in which to add the non-fatty milk solids is that of a condensed sweetened skimmed milk containing about 40 per cent sugar, about 30 per cent of non-fatty milk solids and about 30 per cent of water.

A part of the non-fatty milk solids, if desired, can be added as whole milk, skimmed milk, enriched milk or similar products.

The sugar content of the ice cream base may be added in the form of dry cane sugar or beet sugar "sucrose" or if desired honey may be used. A part of the sugar content of the base can also be added in the form of simple syrup, sweetened condensed milk, sweetened dry milk and the like.

The binder to be used may be any of the binders commonly used in the manufacture of ice cream. For ordinary purposes I consider gelatin to be the best binder to use. In some cases vegetable gums may be used for example gum arabic, or starch or starchy flours, which may be in the cooked or uncooked condition. Vegetable jellies also can be used if desired. The binder should be made up into a substantially liquid or dissolved state with water or milk before being incorporated into the base. Binders of the character are hereinafter referred to under the term "gelatinous material."

The binder can in many cases be omitted, but it is far more advisable to add the same. The binder if used produces substantially the same effect as the binders referred to in the prior art but it has an added advantage in making the product, after sterilization, more stable physically.

In order to more fully illustrate the invention, the following examples are given but it is to be understood that the invention is not limited to these particular formulas, since the formula to be used in any particular case to a large extent depends upon the desired composition of the final ice cream. For making a "14% base" I preferably proceed as follows:

*Example 1.*

10.2 pounds of butter fat (for example in the form of unsalted butter) are mixed with 5 pounds of non-fatty milk solids (for example in the form of condensed skimmed milk) and 14 pounds of sugar are added, this amount including the sugar added as such and also that which is contained in the condensed milk. One-half pound of gelatin or an equivalent amount of other binder dissolved in about a quart of water is added. The mixture is then thoroughly agitated and is passed through a homogenizer under high pressure. The mixture is then sterilized at about 218° for 20 to 30 minutes after which it is put into cans or like packages which are then sealed up. Of course the canning and sealing are performed under sterile conditions. For producing the mixture referred to in this example about 12.5 pounds of unsalted butter (about 80% fat), about 16.7 pounds of condensed sweetened skimmed milk (containing 40% sugar, 30% of non-fatty milk solids and 30% of water), about 7½ pounds of cane sugar in addition to that included in the condensed milk and about one-half pound of gelatin can be used. This mixture will amount to about five gallons, and can be placed into a five gallon can and sealed. At a later time, (after shipping to another part of the country if desired) five gallons of whole milk, (say about 3% butter fat) is added and a suitable flavoring material and a suitable coloring material, and the mixture is frozen. The mixture before freezing will amount to 10 gallons and after freezing will amount to considerably more than 10 gallons it being well understood that the freezing always produces considerable expansion in the mass. The ice cream produced in this manner will contain 14% of butter fat.

Other examples are given as follows:

*Example 2 (10% base).*

Butter fat_____ 17%
Non-fatty milk solids_____ 12%
Sugar _____ 28%
Binder_____ ½ to 5%

*Example 3 (12% base).*

Butter fat_____ 21%
Non-fatty milk solids_____ 11%
Sugar _____ 28%
Binder_____ ½ to 4%

*Example 4 (18% base).*

Butter fat_____ 32%
Non-fatty milk solids_____ 9%
Sugar _____ 28%
Binder_____ ½ to 4%

*Example 5 (8% base).*

Butter fat_____ 14 to 15%
Sugar_____ 27 to 30%
Non-fatty milk solids____ 13 to 14%
Binder_____ ½ to 6%

*Example 6 (20% base).*

Butter fat ____ 36 to 38% (say 37%)
Non-fatty milk solid_____ 8%
Sugar_____ 27 to 30% (say 28%)
Binder_____ ½ to 4% (say 1%)

It will be understood that in the last five examples above given, the procedure as more fully described in the first example will be followed.

In all cases the sterilized base can be diluted with an equal volume of milk of about an average composition (containing say 3% of butter fat) and mixture frozen. It is of course also possible to use, instead of this milk an equal volume of artificial milk made by dissolving dry milk in water, but in this case the final ice cream is usually not quite as good as that produced when using fresh milk in the final step. It is also possible to produce fairly good ice cream by diluting the sterilized base with water but ordinarily I would not employ so great a quantity of water as of milk. Five gallons of the sterilized base can be diluted with say four gallons of pure water and then frozen, to produce a rather poor quality of ice cream.

The base in all of the above cases is a semi-solid mixture, of approximately the consistency of lard at atmospheric temperatures, the 8% base is of course somewhat less viscous than the 20% base, the latter being a little stiffer than ordinary lard.

The final ice cream product is more uniform in quality than can readily be produced by 'small ice cream manufacturers, it is smoother in texture than can readily be produced by small ice cream manufacturers and is substantially free from a "cooked milk" taste. The taste of cooked or boiled milk is well known and is an objection to many of the ice creams heretofore produced by process in which the milk is cooked or boiled. The use of sweetened condensed milk is generally advantageous for producing a slight characteristic flavor, modified by the sterilization. This taste however is not pronounced and is decidedly pleasant to most people.

The homogenizing operation is preferably conducted while the mixture is warm, say at a temperature of 110 to 130° F.

I am aware that it has heretofore been proposed to produce a dry powder which upon mixing with a stated quantity of water (with or without the additional flavoring materials) and freezing, will produce a kind of ice cream. These products however so far as I have been advised have not given entire satisfaction. Manufacturers have not been able to use these products successfully, the products being quite unstable, the butter fat therein becoming rapidly rancid and the ice cream product, even when made from freshly prepared powder being of a coarse texture, and accordingly not finding a ready market. In accordance with the present invention the ice cream base is not to be confused with solid powders it being semisolid or substantially lard like mass, that is about the consistency of lard at ordinary room temperature.

I do not recommend the use of either water or a mixture of water and milk powder for dilution of the base at the time of making the ice cream since the product produced thereby is not so good and is somewhat coarse grained, and may have a cooked milk flavor.

When the water is used in place of a larger volume of milk, the product generally is not so satisfactory. However it is frequently possible to employ such products for use on ship board and the like where fresh milk is unavailable.

I have above referred to adding the flavoring at the time of mixing the base with the milk or milk liquid. In may cases however this and the coloring matter can be added later for example during the freezing operation, at or near the end of the churning during the freezing operation.

It is thought to be entirely unexpected that a product having such a high butter fat content as the ice cream base referred to should be a stable product since heretofore, so far as I have been advised no similar concentrated products containing such high percentages of butter fat have been stable for any length of time.

I am aware that it has been the custom heretofore, to purchase ready made ice cream mix, which can be shipped (in a refrigerated condition usually by express) for a short distance (say fifty or one-hundred miles) but this material has to be used up by the ice-cream manufacturer within a short time, say three or four days, during which time it must be kept refrigerated. On the contrary, I believe it to be new to ship for unlimited distances, in sealed containers, and in a sterilized condition (so that it can be shipped by freight) a concentrated material which by the simple step of adding an equal bulk of ordinary milk, will directly produce a uniform ice cream mix, of known butter fat content. The fact that this material can be kept, unrefrigerated, for months or even years, is also of utmost importance. Thus where the prior practice permits shipping for short distances. I can ship any distance. Where the prior practice requires refrigeration, I require none. Where the prior practice requires shipping and using quickly, my product is stable and will keep indefinitely. In the prior art, a liquid was shipped, while I ship a semi-solid; and while the prior art is to ship a "full strength" material, I ship a "double strength" product (hence only half the amount). My product itself, if frozen (even with flavoring material added), could not be considered as ice cream, to be eaten as such.

The sugar content of the base can vary much more than is stated in the examples e. g. between about 20% and 32%.

It is important to prepare the base so that it contains substantially over 20%, and when so prepared, the sterilization can be readily effected at 218° F., which is a somewhat lower temperature than would be needed if this large amount of sugar were not present. This is also important, as that temperature does not produce any undesired "cooked milk" flavor or taste. Ordinarily the sterilization of milk products requires a considerably higher temperature.

I claim:

1. A sterilized stable ice cream base of semi-solid consistency, at ordinary room temperature, containing non-fatty milk solids, butter fat, and sugar, which base by dilution with about an equal volume of milk and any desired flavoring material, and freezing, will directly produce an ice cream of normal consistency and taste, which ice cream will be free from noticeable cooked-milk taste.

2. A sterilized stable ice cream base of semi-solid consistency, at ordinary room temperature, which by dilution with about an equal volume of milk and any desired flavoring material, and freezing, will directly produce an ice cream of normal consistency and taste, which ice cream will be free from noticeable cooked-milk taste, such base containing the following constituents in the proportions stated:

| | |
|---|---|
| Butter | 14 to 40% |
| Non-fatty milk solids | 8 to 14% |
| Sugar | 26 to 30% |
| Binder | .5 to 5% |

3. A sterilized stable homogeneous ice cream base, of about lard-like consistency at ordinary room temperature such base containing butter fat material, non-fatty milk solids, sugar, and binder 4. A sterilized stable homogeneous ice cream base, of about lard-like consistency at ordinary room temperature such base containing

| | |
|---|---|
| Butter fat | 14 to 40% |
| Non-fatty milk solids | 8 to 14% |
| Sugar | 28 to 30% | and being capable of being diluted with an equal bulk of milk for producing ice cream mix of a known butter-fat content 5. A process which comprises mixing and homogenizing the following materials, (a) material containing butter fat in amount not less than 30%, (b) a concentrated milk product containing upward of 18%, non-fatty milk solids, (c) sugar, and (d) gelatinous material suitable as a binder, these materials being so proportioned as to produce a mass which will be of a thick liquid to semi-solid consistency at ordinary room temperature, and sterilizing such mixture, whereby a sterilized chemically and physically stable mixture is produced adding about an equal bulk of milk liquid thereto, adding flavoring material and freezing the mixture.

6. A sterilized, stable homogeneous ice cream base of about lard like consistency at ordinary room temperature, at least 95% of such product consisting of milk ingredients and sugar, the sugar content being of sufficiently high concentration to make possible the sterilization by subjection to heat of a lower temperature than that ordinarily employed for the sterilization of milk products.

In testimony whereof I affix my signature.

DAVID F. HOSMAN.